(12) United States Patent  
Chung et al.

(10) Patent No.: US 8,189,132 B2  
(45) Date of Patent: May 29, 2012

(54) LIQUID CRYSTAL DISPLAY AND SUBSTRATE THEREOF

(75) Inventors: Te-Chen Chung, Kun Shan (CN); Tean-Sen Jen, Kun Shan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 981 days.

(21) Appl. No.: 12/176,419

(22) Filed: Jul. 21, 2008

(65) Prior Publication Data

US 2009/0033823 A1 Feb. 5, 2009

(30) Foreign Application Priority Data

Aug. 1, 2007 (CN) .......................... 2007 1 0143803

(51) Int. Cl.
*G02F 1/1343* (2006.01)
*G02F 1/1333* (2006.01)
*G02F 1/1345* (2006.01)
(52) U.S. Cl. .............................. 349/55; 349/54; 349/151
(58) Field of Classification Search ................ 349/54–55
See application file for complete search history.

(56) References Cited

U.S. PATENT DOCUMENTS

| 5,532,853 | A | * | 7/1996 | Song et al. ..................... 349/149 |
| 6,111,558 | A | | 8/2000 | Jeung et al. |
| 6,111,621 | A | | 8/2000 | Kim et al. |
| 6,429,908 | B1 | * | 8/2002 | Lim ................................. 349/54 |
| 2003/0112382 | A1 | * | 6/2003 | Takahashi et al. ............... 349/43 |
| 2007/0040794 | A1 | | 2/2007 | Kwak et al. |
| 2007/0206126 | A1 | * | 9/2007 | Lin et al. .......................... 349/54 |
| 2009/0167976 | A1 | * | 7/2009 | Chung et al. ..................... 349/54 |

* cited by examiner

*Primary Examiner* — Wen-Ying P Chen
(74) *Attorney, Agent, or Firm* — Perkins Coie LLP; Aaron Wininger

(57) ABSTRACT

A liquid crystal display having a repair circuit structure and an array substrate of the liquid crystal display are provided. Each of the repair lines of the repair circuit comprises a front repair line portion arranged to cross with a front data line portion in a substantially perpendicular manner, an end repair line portion arranged to cross with an end data line portion in a substantially perpendicular manner, and an intermediate repair line portion connecting the front and end repair line portions. At least two repair lines in the end repair line portion are positioned in different layers so that a parasitic capacitance between respective repair lines in the repair circuit structure can be reduced and signal transmission quality can be ensured.

19 Claims, 6 Drawing Sheets

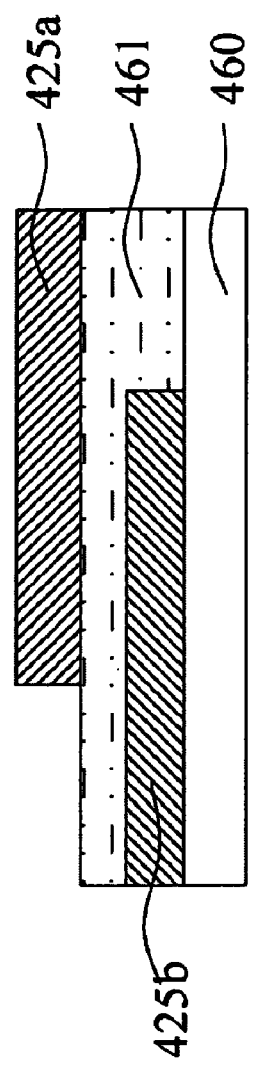
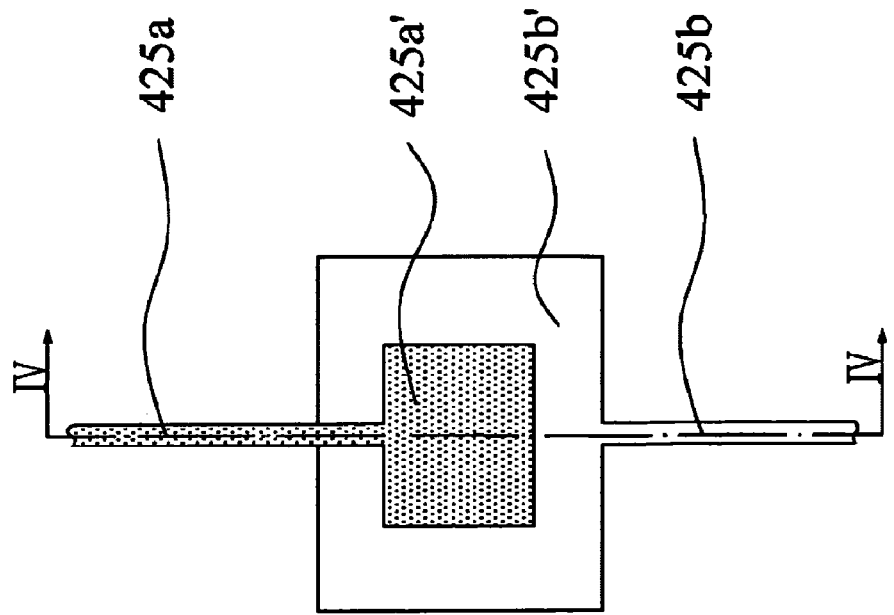
Fig.5B
Fig.5A

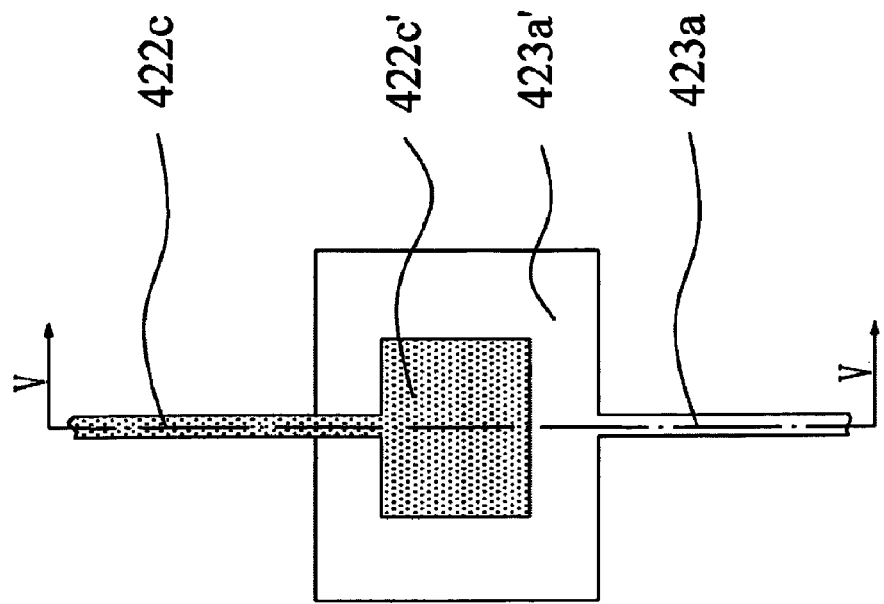
Fig. 7A
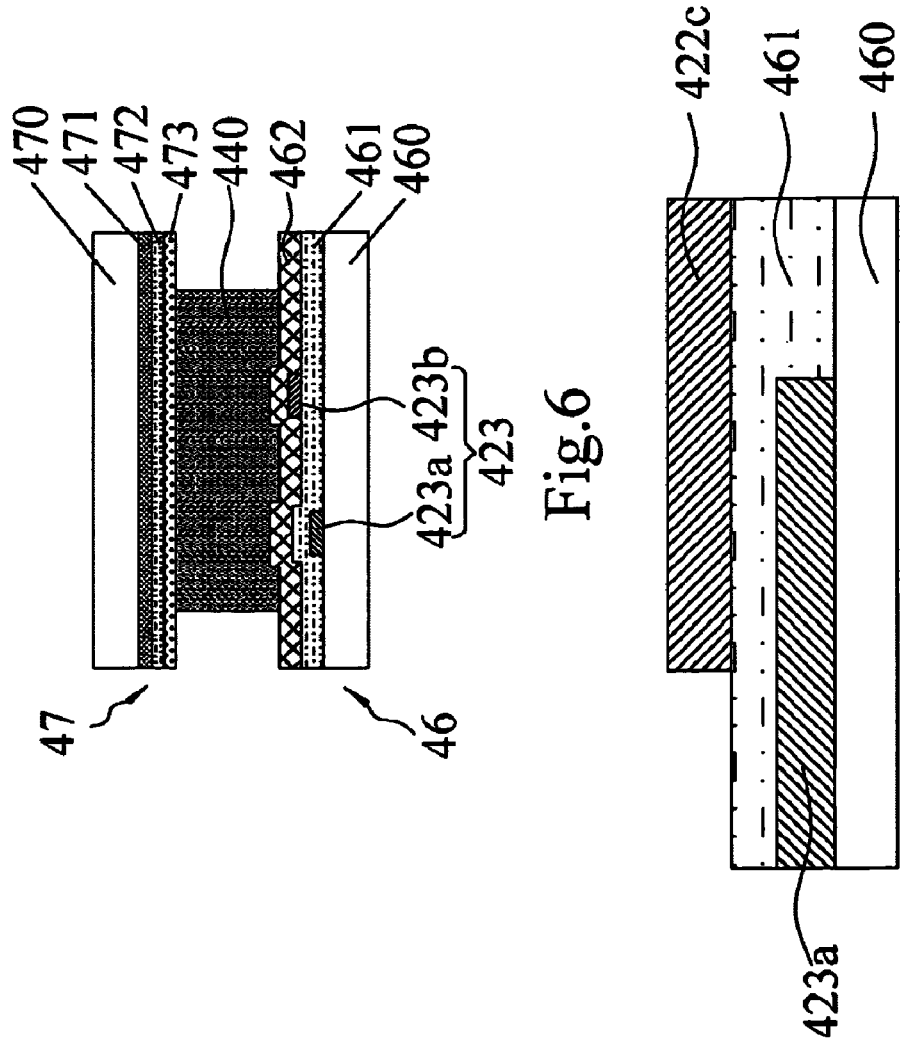
Fig. 6
Fig. 7B

LIQUID CRYSTAL DISPLAY AND SUBSTRATE THEREOF

TECHNICAL FIELD

The present invention relates to a liquid crystal display (LCD) and an array substrate thereof, and in particular to a liquid crystal display having repair line structure.

TECHNICAL BACKGROUNDS

Liquid crystal displays (LCDs) are advantageous in being light, thin and having low power consumption. They are being widely used in modern information devices such as notebook computers, mobile phones, and personal digital assistants (PDAs).

FIG. 1 shows an array substrate of a conventional liquid crystal display. The LCD array substrate 110 comprises a signal introducing region 111 and a display region 113. Data line pads 121 and scanning line pads 131 are formed in the signal introducing region 111. A plurality of data lines 122 and scanning lines 132 are respectively connected to the data line pads 121 and the scanning line pads 131. A plurality of pixels P is defined in a region where the data lines and the scanning lines cross. A data signal and a scanning signal are externally inputted via the data line pads 121 and the scanning line pads 131, and then transmitted to the respective pixels P in the display region 113 through the data lines 122 and the scanning lines 132. An adhesive sealing is provided outside the display region 113 for adhering the LCD array substrate and a color filter together.

In manufacturing processes for conventional LCD array substrates, defects such as a break and the like may occur in the data lines. As shown in FIG. 1, the data line 122 is broken at a point D1 in the display region 113. In this case, a data signal cannot be transmitted to the data line below the break D1, thereby causing a so-called line defect.

In order to repair the line defect in the array substrate, U.S. Pat. No. 6,111,558 discloses a repair structure. In the structure, as shown in FIG. 2 of the present application, a data line 122 comprises three portions, that is, a front data line portion 122a outside the display region and connected with a data line pad 121, a display region data line portion 122b, and an end data line portion 122c outside the display region and at the side away from the data line pad 121. In addition, a repair line 223 is provided outside the display region 113 of the array substrate 110. In the plan view of the array substrate of FIG. 2, the repair line 223 crosses with the front data line portion 122a and the end data line portion 122c perpendicularly. However, in a direction perpendicular to the surface of the array substrate, the repair line 223 and the data line 122 are positioned in different layers separated by an insulating layer therebetween. Hence the repair line 223 and the data line 122 are normally not in an electrical connection.

When a break point D2 occurs as shown in FIG. 2, the front data line portion 122a and the repair line 223 are electrically connected at the crossing point 2A, and the end data line portion 122c and the repair line 223 are electrically connected at the crossing point 2B by laser melting. Thus, a data signal on the data line can be transmitted to the repair line 223 via the crossing point 2A through the front data line portion 122a, and then via the point 2B to the data line below the break point D2. In this manner, the line defect is repaired.

FIG. 3 is a sectional view of the repairing structure along the I-I line of FIG. 2. Repair lines 223a and 223b are formed on a glass substrate 260 of an LCD array substrate 26 and in the same process as the scanning lines. Then a gate insulating film 261 and a passivation layer 262 are formed so as to overlay the repair lines 223a and 223b. A color filter 27 is provided at a position opposite to the LCD array substrate 26, and a light shield layer 271, an insulating layer 272 and a transparent common electrode 273 are formed on the color filter 27 from below to top. The LCD array substrate 26 and the color filter 27 are adhered together with an adhesive sealing 240, with liquid crystal 48 between the array substrate 26 and the color filter 27.

However, in the conventional techniques, all the repair lines are positioned in the same layer. In this case, when there are signals transmitting on two adjacent repair lines, for example repair lines 223a and 223b in FIG. 3, the two repair lines will interact with each other due to parasitic capacitance. In addition, the repair lines are typically made of the same material (Mo and AlNd for example) and in the same process with the scanning lines, leading to a significant resistance.

SUMMARY

A liquid crystal display and an array substrate thereof having a repair circuit for repairing a line defect are provided. The array substrate has a plurality of layers, and comprises a data line comprising a front data line portion, a display region data line portion and an end data line portion; a scanning line configured to cross with the data line; and a repair circuit, which is positioned outside a display region of the array substrate and at least comprises a first repair line and a second repair line. In the liquid crystal display, the first repair line and the second repair line are positioned at least partially in different layers of the array substrate in a direction perpendicular to the surface of the array substrate.

According to an embodiment of the invention, the repair lines of the repair circuit are positioned in different layers such that the parasitic capacitance between the repair lines of the repair circuit is significantly reduced. Moreover, the repair lines may be placed substantially right beneath an adhesive sealing so as to reduce the parasitic capacitance between the repair circuit and the transparent common electrode in the liquid crystal display, resulting in an increased signal transmission quality. In addition, the liquid crystal display may further comprise a printed circuit board separately, and the repair lines can be partially formed on the printed circuit board instead of on the array substrate, thus a material having a high electric conductivity such as copper can be used and the resistance of the repair circuit can be reduced.

BRIEF DESCRIPTION OF THE DRAWINGS

FIG. 5A shows a partially enlarged view of the front repair line portion in the embodiment of FIG. 4.

FIG. 5B is a sectional view of the front repair line portion along the IV-IV line of FIG. 5A FIG. 6 is a sectional view of the repair circuit along the III-III line in FIG. 4.

FIG. 7A shows an enlarged view of the connection region X of the odd number repair line and the end data line portion in the embodiment of FIG. 4.

FIG. 7B is a sectional view of the connection region X along the V-V line in FIG. 7A.

DETAILED DESCRIPTION OF THE INVENTION

Exemplary embodiments will be described in detail in the following with reference to the drawings.

Figure 1:
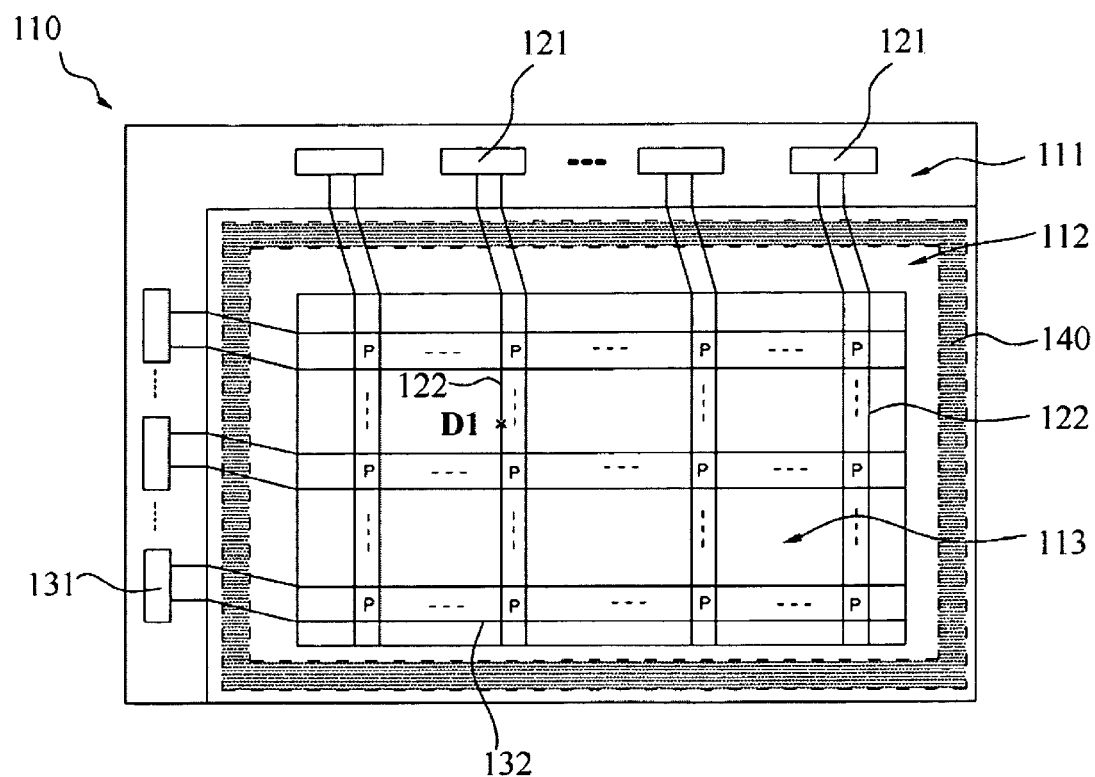
FIG. 1 is a view showing an array substrate of a conventional liquid crystal display.
Figure 2:
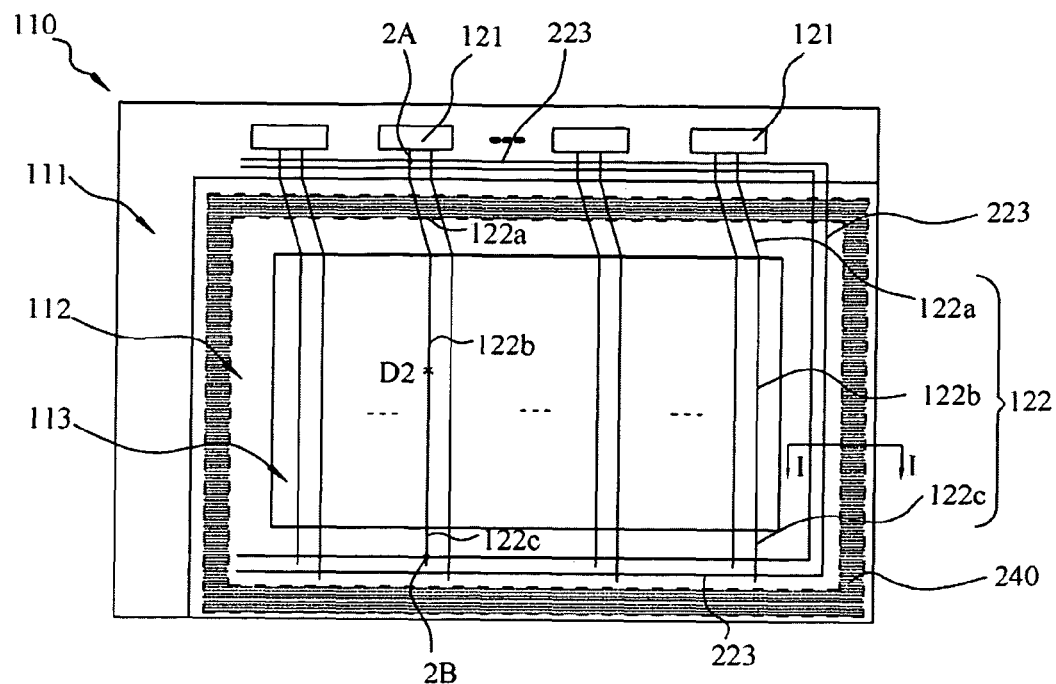
FIG. 2 is a view showing a conventional repair line structure.
Figure 3:
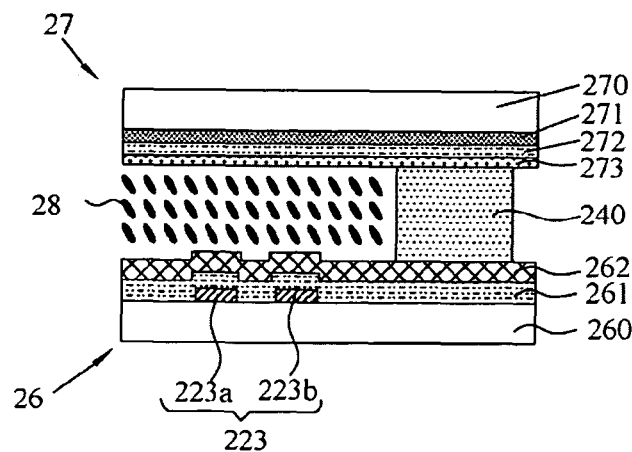
FIG. 3 is a sectional view of the repair line structure along the I-I line in FIG. 2.
Figure 4:
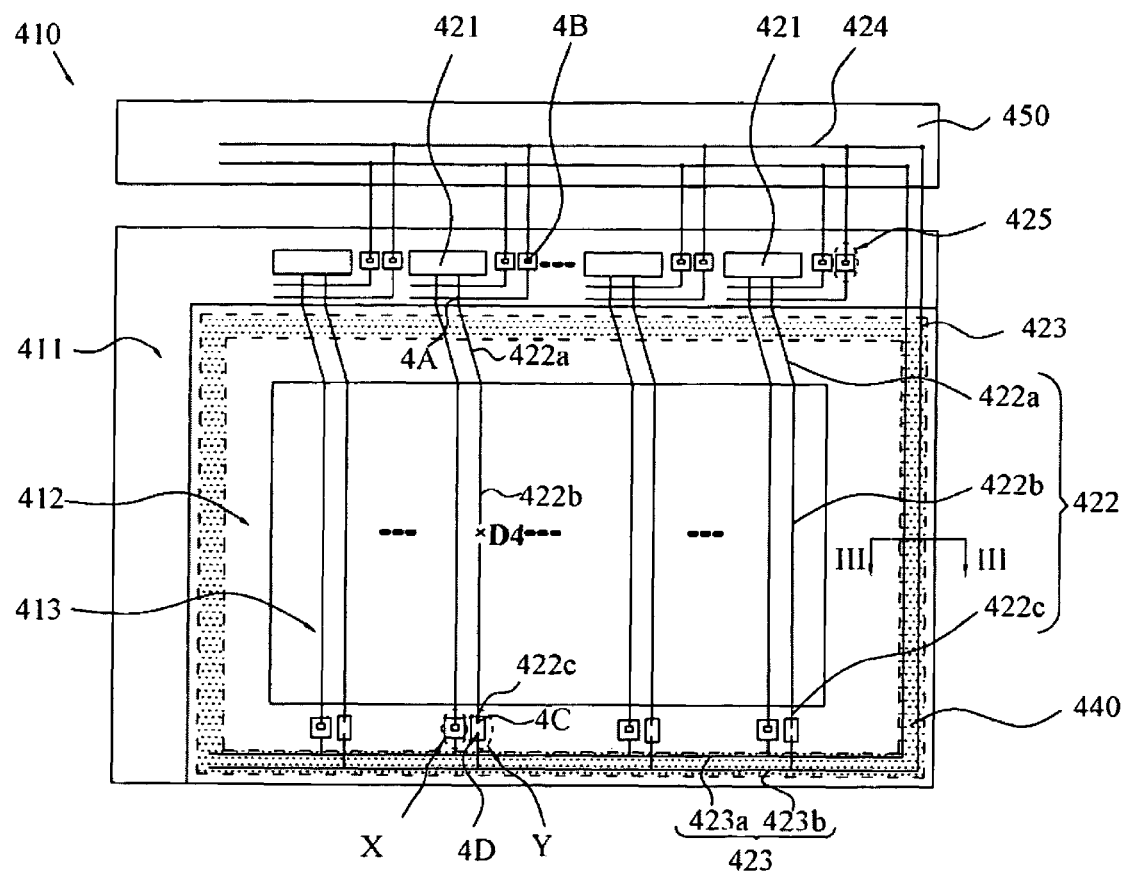
FIG. 4 is a plan view showing a repair line structure of an LCD array substrate in accordance with an embodiment of the invention.

FIG. 4 is a plan view showing a repair circuit structure of an LCD array substrate in accordance with a first embodiment of the invention. The LCD array substrate 410 comprises a display region 413 and a signal introducing region 411. A plurality of data line pads 421 is formed in the signal introducing region 411 and electrically connected with corresponding data lines 422 respectively. Each of the data lines 422 comprises three portions, that is, a front data line portion 422a outside the display region 413 and electrically connected with a corresponding data line pad 421, a display region data line portion 422b in the display region 413, and an end data line portion 422c outside the display region 413 and at the side away from the data line pad 421. A data signal inputted from the data line pad 421 is transmitted through the entire data line 422 from the front data line portion 422a. For the sake of clarity, scanning lines, which are provided crossing the data lines 422, are not shown in FIG. 4.

The repair circuit in accordance with an embodiment of the invention may comprise a plurality of repair lines each of which is composed of a front repair line portion 425, an intermediate repair line portion 424 and an end repair line portion 423. It should be noted, however, that to divide a repair line into a front repair line portion 425, an end repair line portion 423 and an intermediate repair line portion 424 is intended for a clearer description of the invention, and these portions are not necessarily different in terms of material, physical, chemical, electrical and mechanical properties. That is, a repair line may be formed with a uniform conductive material without a distinctive boundary between the respective repair line portions.

The front repair line portion 425 is provided outside the display region 413. When viewed in a direction perpendicular to a surface of the array substrate (referred to as a "perpendicular direction" herein as appropriate), the front repair line portion 425 comprises a portion that at least partially overlaps the front data line portion 422a. For example, the front repair line portion 425 may be arranged substantially perpendicular to the front data line portion 422a. However, in the direction perpendicular to the surface of the array substrate, the front repair line portion 425 and the data line portion 422 lie within different layers and are separated by an insulating layer therebetween, and hence are not in an electrical connection when the corresponding repair line has not been used for repairing a defect in the data line 422. The end repair line portion 423 is also provided outside the display region 413 and comprises a portion that at least partially overlaps the end data line portion 422c, for example, a portion arranged substantially perpendicular thereto. The manner in which the end repair line portion 423 is provided will be described in more detail below. The front repair line portion 425 and the end repair line portion 423 are electrically connected with the intermediate repair line portion 424 respectively. The intermediate repair line portion 424 may be formed on the array substrate. In an alternative embodiment, the intermediate repair line portion 424 may be formed on a separate printed circuit board (PCB) 450, and thus may be formed using a material having high electrical conductivity such as copper, resulting a decreased resistance of the repair circuit.

FIG. 5A shows a partially enlarged view of the front repair line portion 425 in accordance with an embodiment of the invention. The front repair line portion 425 is composed of an external line 425a having an end connected to the intermediate repair line portion 424 on the PCB 450, and a data connection line 425b. When viewed along the direction perpendicular to the surface of the array substrate, the data connection line 425b overlaps the front data line portion 422a. For example, the data connection line 425b may be arranged substantially perpendicular to the front data line portion 422a (see FIG. 4). However, in the direction perpendicular to the surface of the array substrate, the front data line portion 422a and the data connection line 425b are provided within different layers and are separated by an insulating layer therebetween, and hence are normally not in an electrical connection. In repairing, the data connection line 425b and the front data line portion 422a are made electrically connected by, for example, laser melting. In addition, the external line 425a and the data connection line 425b lie within different layers and are separated by an insulating layer therebetween, and hence are normally not in an electrical connection. When viewed along the direction perpendicular to the surface of the array substrate, an end 425a' of the external line and an end 425b' of the data connection line are at least partially overlapping.

FIG. 5B is a sectional view of the front repair line portion 425 along the IV-IV line of FIG. 5A. As shown in FIG. 5B, the data connection line 425b in the front repair line portion 425 is formed on the glass substrate 460 of the LCD array substrate and covered by a gate insulating layer 461, and the external line 425a of the front repair line 425 is formed on the gate insulating layer 461. In the example shown in FIG. 5B, the external line 425a partially overlaps the data connection line 425b in the perpendicular direction.

In accordance with an embodiment of the invention, among the plurality of repair lines of the repair circuit, at least one repair line has its end repair line portion 423 in a different layer than the end repair line portions of other repair lines. In accordance with an embodiment of the invention, for example, the repair circuit comprises two repair lines, that is, a first repair line and a second repair line, of which the end repair line portions 423a and 423b are provided beneath an adhesive sealing 440 and in different layers in the perpendicular direction. In accordance with another embodiment, the repair circuit may comprise three or more repair lines, and in the perpendicular direction, the end repair line portion of the first repair line lies in a first metal layer while the end repair line portions of other repair lines lie in a second metal layer, or the end repair line portion of the first repair line lies in a first metal layer, the end repair line portion of the second repair line lies in a second metal layer and the end repair line portions of other repair lines lie in a third metal layer, and so on.

In the case that the repair circuit structure comprises at least two repair lines (that is, the first repair line, the second repair line and the like) and the end repair line portions of the first and second repair lines lie in different layers, as the ratio of the length of the end repair line portion (that is, the portion of the first repair line that lies in a different layer than that of the second repair line) of the first repair line to the total length of the repair line increases, parasitic capacitance will typically decrease. In an embodiment, the length of the end repair line portion of the first repair line is at least about 10% of the total length of the first repair line. In another embodiment, the length of the end repair line portion of the first repair line is at least about 50% of the total length of the first repair line.

FIG. 6 is a sectional view of the repair circuit along the III-III line in FIG. 4. The end repair line portion 423a of the first repair line is formed on the glass substrate 460 of the LCD array substrate 46 and is covered by a gate insulating film 461. The end repair line portion 423b of the second repair line is formed on the gate insulating film 461, and a passivation layer 452 is covered on the top. The end repair line portion 423a of the first repair line may be formed in the same process as the scanning lines which are not shown, and the end repair line portion 423b of the second repair line may be formed in the same process as the data lines 422. It should be noted that although FIG. 6 only shows the end repair line portion in the repair circuit structure, the front repair line portions of the repair lines may be formed in a similar manner.

A color filter 47 is provided opposite to the LCD array substrate 46, and comprises a filter substrate 470, a light shield layer 471, an insulating layer 472 and a transparent common electrode 473 from the top down. The LCD array substrate 46 and the color filter 47 are adhered with an adhesive sealing 440. In order to facilitate description, the portion on the surface of the array substrate that is provided with the adhesive sealing will be referred to as a "first region". As stated above, in the embodiment, the end repair line portions 423a and 423b of the first and second repair lines in the repair circuit are substantially positioned right beneath the first region, that is, right beneath the adhesive sealing 440. "The end repair line portions are substantially positioned right beneath the adhesive sealing (or the first region)" here means when viewed along the normal direction of the surface of the array substrate, these end repair line portions are covered partially or completely by the adhesive sealing or the first region. By providing the end repair line portions substantially right beneath the adhesive sealing, the parasitic capacitance between the repair circuit and the transparent common electrode of the liquid crystal display can be reduced, and a signal can be transmitted with increased quality.

The end repair line portion 423a of the first repair line overlaps the end data line portion 422c at least partially at the connection region X shown in FIG. 4. FIG. 7A shows an enlarged view of the connection region X. As shown in FIG. 7A, when viewed along the direction perpendicular to the surface of the array substrate, an end 423a' of the end repair line portion 423a in the first repair line is provided at least partially overlapping an end 422c' of the end data line portion 422c.

FIG. 7B is a sectional view of the connection region X along the V-V line in FIG. 7A. As shown in FIG. 7B, the end repair line portion 423a of the first repair line is formed on the array substrate 460, a gate insulating layer 461 covers the end repair line portion 423a, and the end data line portion 422c is formed on the gate insulating layer 461. In the embodiment shown in FIG. 7B, the end data line portion 422c overlaps partially the end repair line portion 423a in the perpendicular direction.

Figure 8A:
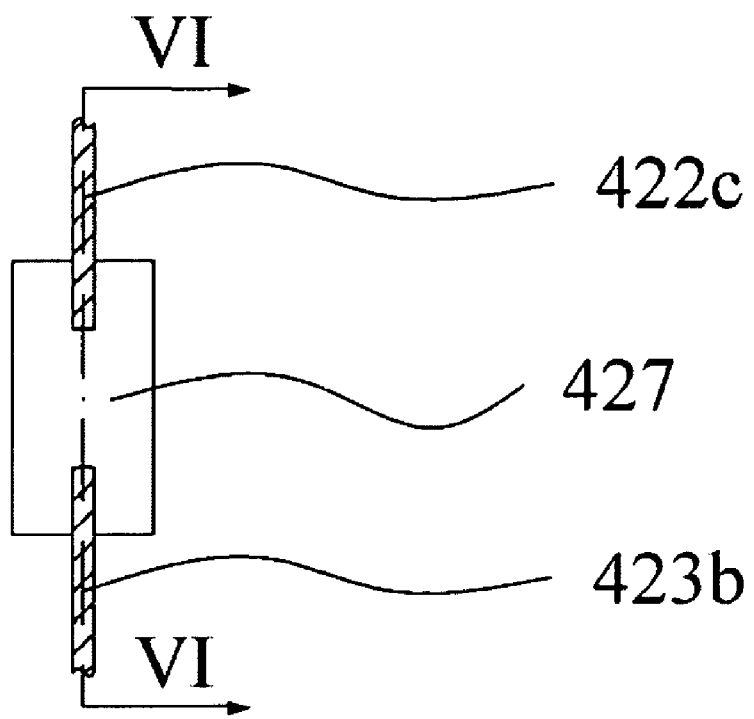
FIG. 8A is an enlarged view of the connection region Y of the even number repair line and the end data line portion in the embodiment of FIG. 4.

The end repair line portion 423b of the second repair line overlaps the end data line portion 422c at least partially at the region Y shown in FIG. 4, for example, in a substantially perpendicular manner. FIG. 8A is an enlarged view of the connection region Y, in which the label 427 represents a connection portion. When viewed along the direction perpendicular to the surface of the array substrate, the end repair line portion 423b of the second repair line and the end data line portion 422c are partially overlapping the connection portion 427 respectively.

Figure 8B:
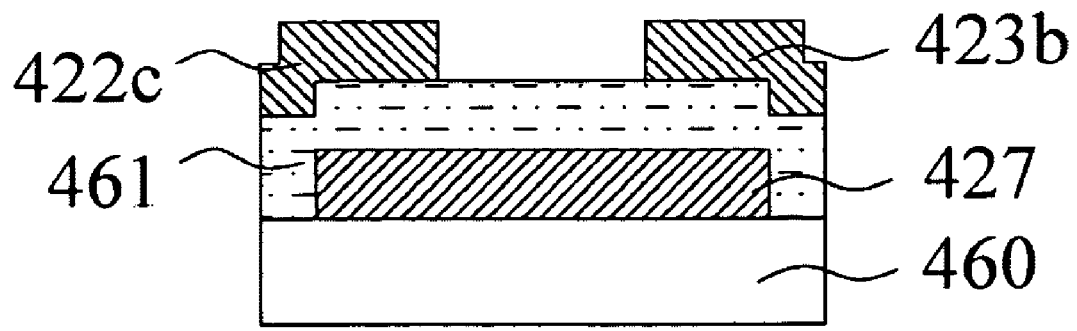
FIG. 8B is a sectional view of the connection region Y in FIG. 8A along the VI-VI line.

FIG. 8B is a sectional view of the connection region shown in FIG. 8A along the VI-VI line. The connection portion 427 is formed on the array substrate 460, and the gate insulating layer 461 covers the connection portion 427. The end data line portion 422c and the end repair line portion 423b in the second repair line portion are formed on the gate insulating layer 461, and partially overlap the connection portion 427 in the perpendicular direction respectively. The connection portion 427, due to a small size thereof, introduces very little influence of parasitic capacitance although it lies in the same layer as the first repair line. Such parasitic capacitance, in comparison with the case in which the whole of the second repair line lies in the same layer with the whole of the first repair line, is negligible.

With the above described repair circuit structure, in case that a break, for example the break D4 shown in FIG. 4, occurs, the front data line portion 422a and the data connection line 425b are electrically connected at the crossing point 4A, the data connection line 425b and the external line 425a are electrically connected at an overlapping region 4B, the end data line portion 422c and the connection portion 427 are electrically connected at an overlapping region 4C of the connection region Y, and the end repair line portion 423b of the second repair line and the connection portion 427 are electrically connected at an overlapping region 4D of the connection region Y, by laser melting for example. As a result, a data signal on the front data line portion 422a can be transmitted to the intermediate repair line portion 424 on the PCB via the point 4A, the data connection line 425b, the point 4B and the external line 425a, and then to the data line below the break point D4 via the second repair line, the points 4C and 4D, thus the defect on the data line is repaired.

Defect repair with the first repair line is carried out in a manner similar to the above, and the difference lies in that the end repair line portion 423a of the first repair line and the end data line portion 422c are electrically connected by, for example, laser melting at the connection region X instead of at the overlapping regions 4C and 4D of the connection region Y.

In accordance with another embodiment of the invention, the plurality of repair lines included in the repair circuit can be divided into two groups, which are referred to as the odd number repair lines and the even number repair lines for facilitating the description. In the perpendicular direction, the end repair line portions of the odd number repair lines lie in a first metal layer, and the end repair line portions of the even number repair lines lie in a second metal layer different from the first metal layer. For example, the end repair line portions in the first metal layer may be provided under the gate insulating layer 461 in FIG. 6, and the end repair line portions in the second metal layer may be provided on the gate insulating layer 461. In case that the odd number repair lines and the even number repair lines each comprise a plurality of repair lines, when viewed along the direction perpendicular to the surface of the array substrate, the projection of each repair lines in the two groups on the array substrate is arranged in an alternate manner of "odd-even-odd-even . . . ", while the end repair line portions of the two groups of the repair lines lie in different metal layers in the perpendicular direction. The description regarding the first embodiment also applies to this embodiment, as long as the "first repair line" and the "second repair line" in the first embodiment are replaced with the "odd number repair lines" and the "even number repair lines".

As stated above, in a repair circuit composed of a plurality of repair lines, a parasitic capacitance may occur between adjacent repair lines which act as electrode plates for the parasitic capacitance. In accordance with embodiments of the invention, however, the respective repair lines in the repair circuit are positioned in different layers at least partially, thus the equivalent electrode plates can have a decreased overlapping area in a direction connecting them and an increased distance between them, resulting a substantially decreased parasitic capacitance between respective repair lines of the repair circuit. In addition, the repair circuit may be provided substantially right beneath the adhesive sealing, thus the parasitic capacitance between the repair circuit and the transparent common electrode of the liquid crystal display may be reduced and a signal may be transmitted with increased quality. Moreover, a part of each of the repair lines may be formed on a separate printed circuit board instead of on the array substrate, which makes it possible to use a material having a high electrical conductivity such as copper, and the electrical resistance of the repair circuit can be reduced.

The positional relationship between the first repair line and the second repair line, and that between the odd number repair lines and the even number repair lines are only illustrative, and the repair circuit of the invention is not limited to the specific structure described above. Various modifications may occur to those skilled in the art within the scope of the invention set forth in the claims. In accordance with the invention, each of a plurality of repair lines may comprise an end repair line portion 423 of its own, as long as such end repair line portions are provided in two or more layers and at least two of them are not in the same layer. The insulating layer may be one layer or a plurality of layers. In addition, the structures of the overlapping regions and the connection portions are only illustrative for explaining the principle of the invention and not limitation. The scope of the invention is defined by the claims instead of the above specific embodiments.

The invention claimed is:

1. A liquid crystal display comprising an array substrate, the array substrate having a plurality of layers and comprising:
    a data line comprising a front data line portion, a display region data line portion and an end data line portion;
    a scanning line configured to cross with the data line; and
    a repair circuit, which is positioned outside a display region of the array substrate and at least comprises a first repair line and a second repair line,
    wherein the first repair line and the second repair line are positioned at least partially in different layers of the array substrate in a direction perpendicular to the surface of the array substrate, and the portion of the first repair line that is positioned in a different layer from the second repair line has a length of at least about 10% of the length of the first repair line.

2. The liquid crystal display in accordance with claim 1, wherein each of the first repair line and the second repair line comprises:
    a front repair line portion comprising a portion that is electrically isolated from the front data line portion when the corresponding repair line is not used to carry out a defect repair and electrically connected with the front data line portion when the corresponding repair line is used to carry out a defect repair;
    an end repair line portion comprising a portion that is electrically isolated from the end data line portion when the corresponding repair line is not used to carry out a defect repair and electrically connected with the end data line portion when the corresponding repair line is used to carry out a defect repair; and
    an intermediate repair line portion electrically connecting the front repair line portion with the end repair line portion,
    wherein the end repair line portions of the first and second repair lines are respectively positioned in different layers of the array substrate in the direction perpendicular to the surface of the array substrate.

3. The liquid crystal display in accordance with claim 2, further comprising a color filter and an adhesive sealing adhering the array substrate and the color filter together, wherein in the repair circuit, at least the end repair line portions of the first and second repair lines are positioned substantially right beneath the adhesive sealing.

4. The liquid crystal display in accordance with claim 2, wherein the end repair line portion and the end data line portion of the first repair line or the second repair line at least partially overlap when viewed along the direction perpendicular to the surface of the array substrate, and have an insulating portion therebetween.

5. The liquid crystal display in accordance with claim 2, wherein the array substrate further comprises a connecting member which, when viewed along the direction perpendicular to the surface of the array substrate, has a portion at least partially overlapping the end repair line portion of the first repair line or the second repair line with an insulating portion therebetween, and another portion at least partially overlapping the end data line portion with an insulating portion therebetween.

6. The liquid crystal display in accordance with claim 2, further comprising a printed circuit board and wherein the intermediate repair line portion of the first repair line or the second repair line is positioned at least partially on the printed circuit board.

7. The liquid crystal display in accordance with claim 6, wherein the material of the intermediate repair line portion comprises copper.

8. The liquid crystal display in accordance with claim 2, wherein the front repair line portion comprises a data connection line and an external line which at least partially overlap when viewed along the direction perpendicular to the surface of the array substrate, with an insulating portion therebetween.

9. The liquid crystal display in accordance with claim 2, wherein the repair circuit comprises odd number repair lines comprising the first repair line and even number repair lines comprising the second repair line, and the respective end repair line portions of the odd number repair lines and of the even number repair lines are arranged in an alternate manner when viewed along the direction perpendicular to the surface of the array substrate and positioned in different layers.

10. The liquid crystal display in accordance with claim 1, wherein the first repair line and the scanning line are positioned in a first metal layer of the array substrate, the second repair line and the data line are positioned in a second metal layer of the array substrate, and an insulating layer is provided between the first metal layer and the second metal layer.

11. An array substrate for a liquid crystal display, having a plurality of layers and comprising:
    a data line comprising a front data line portion, a display region data line portion and an end data line portion;
    a scanning line configured to cross with the data line; and
    a repair circuit, which is positioned outside a display region of the array substrate and at least comprises a first repair line and a second repair line, wherein the first repair line and the second repair line are positioned at least partially in different layers of the array substrate in a direction perpendicular to the surface of the array substrate, and the portion of the first repair line that is positioned in a different layer from the second repair line has a length of at least about 10% of the length of the first repair line.

12. The array substrate in accordance with claim 11, wherein each of the first repair line and the second repair line comprises:
a front repair line portion comprising a portion that is electrically isolated from the front data line portion when the corresponding repair line is not used to carry out a defect repair and electrically connected with the front data line portion when the corresponding repair line is used to carry out a defect repair;
an end repair line portion comprising a portion that is electrically isolated from the end data line portion when the corresponding repair line is not used to carry out a defect repair and electrically connected with the end data line portion when the corresponding repair line is used to carry out a defect repair; and
an intermediate repair line portion electrically connecting the front repair line portion with the end repair line portion,
wherein the end repair line portions of the first and second repair lines are respectively positioned in different layers of the array substrate in the direction perpendicular to the surface of the array substrate.

13. The array substrate in accordance with claim 12, further comprising a first region for an adhesive sealing adhering a color filter of the liquid crystal display and the array substrate together, wherein in the repair circuit, at least the end repair line portions of the first and second repair lines are positioned beneath the adhesive sealing.

14. The array substrate in accordance with claim 12, wherein the end repair line portion and the end data line portion of the first repair line or the second repair line at least partially overlap when viewed along the direction perpendicular to the surface of the array substrate, and have an insulating portion therebetween.

15. The array substrate in accordance with claim 12, further comprising a connecting member which, when viewed along the direction perpendicular to the surface of the array substrate, has a portion at least partially overlapping the end repair line portion of the first repair line or the second repair line with an insulating portion therebetween, and another portion at least partially overlapping the end data line portion with an insulating portion therebetween.

16. The array substrate in accordance with claim 12, wherein the front repair line portion comprises a data connection line and an external line which at least partially overlap when viewed along the direction perpendicular to the surface of the array substrate, with an insulating portion therebetween.

17. The array substrate in accordance with claim 12, wherein the repair circuit comprises odd number repair lines comprising the first repair line and even number repair lines comprising the second repair line, and the respective end repair line portions of the odd number repair lines and of the even number repair lines are arranged in an alternate manner when viewed along the direction perpendicular to the surface of the array substrate and positioned in different layers.

18. The array substrate in accordance with claim 11, wherein the first repair line and the scanning line are positioned in a first metal layer of the array substrate, the second repair line and the data line are positioned in a second metal layer of the array substrate, and an insulating layer is provided between the first metal layer and the second metal layer.

19. A liquid crystal display comprising an array substrate, a color filter and an adhesive sealing adhering the array substrate and the color filter together, the array substrate having a plurality of layers and comprising: a data line comprising a front data line portion, a display region data line portion and an end data line portion; a scanning line configured to cross with the data line; and a repair circuit, which is positioned outside a display region of the array substrate and at least comprises a first repair line and a second repair line, wherein
the first repair line and the second repair line are positioned at least partially in different layers of the array substrate in a direction perpendicular to the surface of the array substrate,
each of the first repair line and the second repair line comprises: a front repair line portion comprising a portion that is electrically isolated from the front data line portion when the corresponding repair line is not used to carry out a defect repair and electrically connected with the front data line portion when the corresponding repair line is used to carry out a defect repair; an end repair line portion comprising a portion that is electrically isolated from the end data line portion when the corresponding repair line is not used to carry out a defect repair and electrically connected with the end data line portion when the corresponding repair line is used to carry out a defect repair; and an intermediate repair line portion electrically connecting the front repair line portion with the end repair line portion, wherein the end repair line portions of the first and second repair lines are respectively positioned in different layers of the array substrate in the direction perpendicular to the surface of the array substrate, and
in the repair circuit, at least the end repair line portions of the first and second repair lines are positioned substantially right beneath the adhesive sealing.

* * * * *